United States Patent
Wigmore

(10) Patent No.: US 8,028,110 B1
(45) Date of Patent: Sep. 27, 2011

(54) NON-DISRUPTIVE DATA MIGRATION AMONG STORAGE DEVICES USING INTEGRATED VIRTUALIZATION ENGINE OF A STORAGE DEVICE

(75) Inventor: Ian Wigmore, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 481 days.

(21) Appl. No.: 11/823,619

(22) Filed: Jun. 28, 2007

(51) Int. Cl.
*G06F 13/12* (2006.01)
*G06F 11/00* (2006.01)

(52) U.S. Cl. .............................. 710/74; 714/6

(58) Field of Classification Search .............. 700/100; 710/74

See application file for complete search history.

(56) References Cited

U.S. PATENT DOCUMENTS

| | | | |
|---|---|---|---|
| 6,813,688 B2 * | 11/2004 | Wu et al. ................. | 711/114 |
| 7,055,056 B2 * | 5/2006 | Bessire ..................... | 714/6 |
| 2007/0239944 A1 | 10/2007 | Rupanagunta et al. | |

OTHER PUBLICATIONS

Emulex Corporation, Emulex HBAs in VMware SSX server virtualisation environments supported and qualified by Sun Microsystems; Sun-branded HBAs from Emulex deliver scalable performance for Sun server and storage coupled with VMware ESX server, Jul. 25, 2006, Proquest.*
R. Cwiakala, et al., "MVS Dynamic Reconfiguration Management," *IBM J. Res. Develop.* vol. 36, No. 4, Jul. 1992, pp. 633-646.
U.S. Appl. No. 10/879,383, Halligan, et al.
U.S. Appl. No. 11/823,683, Wigmore.

* cited by examiner

*Primary Examiner* — Henry Tsai
*Assistant Examiner* — Titus Wong
(74) *Attorney, Agent, or Firm* — Muirhead and Saturnelli, LLC

(57) ABSTRACT

Transferring I/O from a first storage device coupled to a storage area network to a second storage device coupled to the storage area network includes blocking I/O operations for a first port of the first storage device coupled to the storage area network, where the first port is associated with an identifier, coupling the second storage device to the storage area network via a port associated with the identifier and reestablishing a connection between the host and the first port to cause I/O operations by the host to be routed to the second storage device. Transferring may also include, following blocking I/O operations for the first port of the first storage device, coupling a second port of the first storage device to the storage area network and migrating data from the first storage device to the second storage device through the second port of the first storage device without host/application disruption.

17 Claims, 7 Drawing Sheets

NON-DISRUPTIVE DATA MIGRATION AMONG STORAGE DEVICES USING INTEGRATED VIRTUALIZATION ENGINE OF A STORAGE DEVICE

BACKGROUND OF THE INVENTION

1. Technical Field

This application relates to computer storage devices, and more particularly to the field of migrating data between storage devices coupled to a network.

2. Description of Related Art

A storage area network may be used to couple one or more host devices with one or more storage devices in a manner that allows reconfiguring connections without having to physically disconnect and reconnect cables from and to ports of the devices. A storage area network may be implemented using one or more switches to which the storage devices and the host devices are coupled. The storage area network may be essentially transparent to the devices so that the devices operate in a manner identical or similar to their operation when directly connected to each other. The switches may be programmed to allow connections between specific ports of devices coupled to the switches. A port that can initiate a data-path connection is called an "initiator" port while the other port may be deemed a "target" port.

Referring to FIG. 1, a storage area network 20 is shown as having a plurality of host devices 22-24 and a plurality of storage devices 26-28 coupled thereto. Each of the devices 22-24, 26-28 has a corresponding port that is physically coupled to switches used to implement the storage area network 20. The switches may be separately programmed by one of the devices 22-24, 26-28 or by a different device (not shown). Programming the switches may include setting up specific zones that describe allowable data-path connections (which ports may form a data-path connection) and possible allowable initiator ports of those configurations. For example, there may be a zone for connecting the port of the host 22 with the port of the storage device 28. Upon becoming activated (e.g., powering up), the host 22 and the storage device 28 may send appropriate signals to the switch(es) of the storage area network 20, and each other, which then allows the host 22 to initiate a data-path connection between the port of the host 22 and the port of the storage device 28. Zones may be defined in terms of a unique identifier associated with each of the ports, such as such as a 64-bit world-wide port name (WWPN).

In some cases, it may be desirable to replace or at least augment a storage device coupled to the storage area network 20. However, since each port of each storage device has a unique identifier (e.g., WWPN), and since the zones are programmed into the switch(es) of the storage area network 20 using the unique identifiers, using a new storage device could require reprogramming all of the hosts coupled to the old storage device and/or could require adding new zones for the new storage device, one or both of which may be unacceptable. For example, there may be instances where it is not acceptable to have any appreciable downtime of applications running on hosts.

Accordingly, it is desirable to be able to provide a mechanism for migrating data and redirecting I/O operations for storage devices coupled to a storage area network without requiring reprogramming/reconfiguring storage area network switch(es) and/or without requiring reprogramming of hosts to change pathing information.

SUMMARY OF THE INVENTION

According to the present invention, transferring I/O from a first storage device coupled to a storage area network to a second storage device coupled to the storage area network includes blocking I/O operations for a first port of the first storage device coupled to the storage area network, where the first port is associated with a first identifier, coupling the second storage device to the storage area network via a port associated with a second identifier different from the first identifier, coupling a virtualization engine to the storage area network via a first port provided with the first identifier and via a second port, and causing at least a portion of I/O operations received by the virtualization engine through the first port thereof to be routed through the second port thereof to the second storage device. Following blocking I/O operations for the first port of the first storage device, the first storage device may be coupled to the storage area network using a second port of the first storage device and data may be migrated from the first storage device to the second storage device through the second port of the first storage device. In response to the second storage device receiving an I/O operation for data that has not yet been migrated from the first storage device, the second storage device may cause the data to be migrated prior to servicing the I/O operation. Transferring I/O from a first storage device coupled to a storage area network to a second storage device coupled to the storage area network may also include, following completion of data migration from the first storage device to the second storage device, removing the first storage device from the storage area network. Transferring I/O from a first storage device coupled to a storage area network to a second storage device coupled to the storage area network may also include the virtualization engine servicing command/status requests destined for the first storage device. The virtualization engine may include hardware that automatically redirects data I/O operations to the second storage device without further processing outside the hardware. The identifiers associated with the ports may be worldwide port names. The storage area network may provide fibre channel connections.

According further to the present invention, computer software, provided in a computer-readable storage medium, transfers I/O from a first storage device coupled to a storage area network to a second storage device coupled to the storage area network. The software includes executable code that blocks I/O operations for a first port of the first storage device coupled to the storage area network, where the first port is associated with a first identifier, executable code that establishes a connection between the second storage device and the storage area network via a port associated with a second identifier different from the first identifier, executable code that establishes a connection between a virtualization engine and the storage area network via a first port provided with the first identifier and via a second port, and executable code that causes at least a portion of I/O operations received by the virtualization engine through the first port thereof to be routed through the second port thereof to the second storage device. The software may also include executable code that establishes a connection between a second port of the first storage device and the storage area network and that migrates data from the first storage device to the second storage device through the second port of the first storage device following blocking I/O operations for the first port of the first storage device. In response to the second storage device receiving an I/O operation for data that has not yet been migrated from the first storage device, executable code of the second storage device may cause the data to be migrated prior to servicing the I/O operation. The computer software may also include executable code that causes the virtualization engine to service command/status requests destined for the first storage device. The identifiers associated with the ports may be worldwide port names. The storage area network may provide fibre channel connections.

According further to the present invention, a system for redirecting I/O operations includes a storage area network, a first storage device coupled to the storage area network via a first port of the first storage device associated with a first identifier, a second storage device coupled to the storage area network via a port of the second storage device associated with a second identifier different from the first identifier, and a virtualization engine coupled to the storage area network via a first port of the virtualization engine associated with the first identifier, where the first port of the first storage device is blocked and at least a portion of I/O operations received by the virtualization engine through the first port thereof are routed through the second port thereof to the second storage device. Following blocking I/O operations for the first port of the first storage device, a second port of the first storage device may be coupled to the storage area network and data may be migrated from the first storage device to the second storage device through the second port of the first storage device. In response to the second storage device receiving an I/O operation for data that has not yet been migrated from the first storage device, the second storage device may cause the data to be migrated prior to servicing the I/O operation. Following completion of data migration from the first storage device to the second storage device, the first storage device may be removed from the storage area network. The identifiers associated with the ports may be worldwide port names. The storage area network may provide fibre channel connections.

According further to the present invention, transferring I/O from a first storage device coupled to a storage area network to a second storage device coupled to the storage area network includes blocking I/O operations for a first port of the first storage device coupled to the storage area network, where the first port is associated with an identifier, coupling the second storage device to the storage area network via a second port associated with the identifier, and establishing a connection between the host and the second port to cause I/O operations by the host to be routed to the second port, where the second storage device appears to the host to be the first storage device. Transferring I/O from a first storage device coupled to a storage area network to a second storage device coupled to the storage area network may also include, following blocking I/O operations for the first port of the first storage device, coupling a second port of the first storage device to the storage area network and migrating data from the first storage device to the second storage device through the second port of the first storage device. In response to the second storage device receiving an I/O operation for data that has not yet been migrated from the first storage device, the second storage device may cause the data to be migrated prior to servicing the I/O operation. Transferring I/O from a first storage device coupled to a storage area network to a second storage device coupled to the storage area network may also include, following completion of data migration from the first storage device to the second storage device, removing the first storage device from the storage area network. Transferring I/O from a first storage device coupled to a storage area network to a second storage device coupled to the storage area network may also include the second storage device servicing command/status requests destined for the first storage device. The second storage device may include hardware that automatically redirects command/status requests to the first storage device without further processing outside the hardware. The identifiers associated with the ports may be worldwide port names. The storage area network may provide fibre channel connections.

According further to the present invention, computer software, provided in a computer-readable storage medium, transfers I/O from a first storage device coupled to a storage area network to a second storage device coupled to the storage area network. The software includes executable code that blocks I/O operations for a first port of the first storage device coupled to the storage area network, where the first port is associated with an identifier, executable code that establishes a connection between the second storage device and the storage area network via a second port associated with the identifier, and executable code that establishes a connection between the host and the second port to cause I/O operations by the host to be routed to the second storage device, wherein the second storage device appears to the host to be the first storage device. The computer software may also include executable code that establishes a connection between a second port of the first storage device and the storage area network and that migrates data from the first storage device to the second storage device through the second port of the first storage device following blocking I/O operations for the first port of the first storage device. In response to the second storage device receiving an I/O operation for data that has not yet been migrated from the first storage device, executable code of the second storage device may cause the data to be migrated prior to servicing the I/O operation. The computer software may also include executable code that causes the second storage device to service command/status requests destined for the first storage device. The identifiers associated with the ports may be worldwide port names. The storage area network may provide fibre channel connections.

According further to the present invention, a system for redirecting I/O operations includes a storage area network, a first storage device coupled to the storage area network via a first port of the first storage device associated with an identifier, and a second storage device coupled to the storage area network via a second port of the second storage device associated with the identifier, where the first port of the first storage device is blocked and I/O operations are routed to the second storage device through the storage area network. Following blocking I/O operations for the first port of the first storage device, a second port of the first storage device may be coupled to the storage area network and data may be migrated from the first storage device to the second storage device through the second port of the first storage device. In response to the second storage device receiving an I/O operation for data that has not yet been migrated from the first storage device, the second storage device may cause the data to be migrated prior to servicing the I/O operation. Following completion of data migration from the first storage device to the second storage device, the first storage device may be removed from the storage area network. The identifiers associated with the ports may be worldwide port names. The storage area network may provide fibre channel connections.

The system described herein allows for a single point of management for heterogeneous storage and may facilitate governmental compliance, which dictates that distributed storage assets be centrally controlled. The system may be used in connection with thin provisioning to maximize storage utilization. The system may facilitate data mirroring for business continuance. The system supports heterogeneous replication by allowing for transparent data migration across different storage platforms/tiers. The system may be used to provide Information Life Management (ILM) strategies, point-in-time snapshots, and be used to copy clone data for diverse uses. The system may provide the ability to integrate more storage into an overall storage pool without disruption and provide a consistent SCSI abstraction layer to the host, allowing for a common set of multi-path drivers and tools. The system may be used as a future platform for policy based storage compliance/automation and allow integration of Virtual Tape Library (VTL) capabilities. The system may use common encryption keys and facilitate heterogeneous data migration.

DETAILED DESCRIPTION OF VARIOUS EMBODIMENTS

Figure 2:
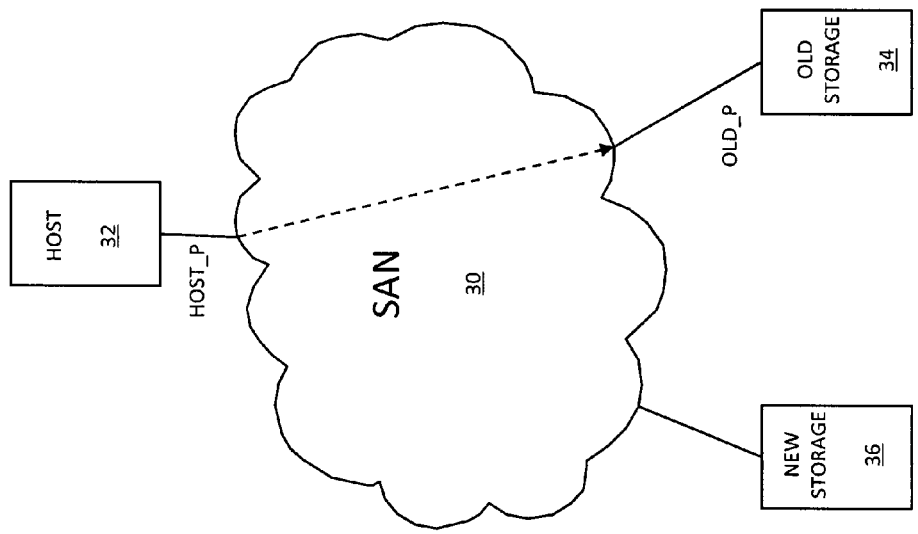
FIG. 2 is a diagram illustrating a storage area network coupled to a host, an old storage device, and a new storage device with a data path from the host to the old storage device according to the system described herein.
Figure 1:
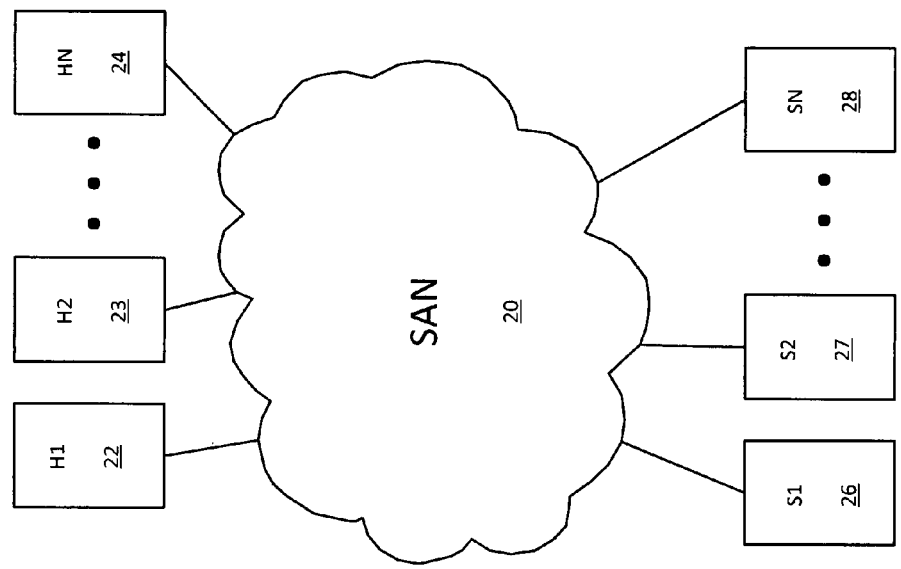
FIG. 1 is a diagram showing a conventional storage area network coupled to a plurality of host devices and a plurality of storage devices.

Referring to FIG. 2, a storage area network 30 is shown as having coupled thereto a host 32, an old storage device 34, and a new storage device 36. The storage area network 30 may be provided using any appropriate technology consistent with the description herein that can facilitate couplings between ports of devices. In an embodiment herein, the storage area network 30 may be provided using conventional Fibre Channel connectivity protocol and one or more switches. Of course, in other embodiments, the storage area network 30 may provide coupling using other appropriate connectivity protocols and/or switch technology consistent with the description herein.

Note that the storage area network 30 is illustrated in FIG. 2 with only a single host and two storage devices, but the system described herein may be implemented for systems having any number of hosts and any number of storage devices coupled to the storage area network of 30. Note also that the host 32 should be understood as including any device which may read and/or write data from and to a storage device. For example, the host 32 could, in some cases, represent another storage device. Similarly, a storage device should be understood as including any apparatus or portion thereof capable of receiving data and returning received data.

Data may be organized on the storage devices 34, 36 as one or more logical volumes that map to physical storage locations. The host 32 may access the logical volumes by specifying locations on the logical volumes (e.g., volume ID, cylinder, and track, block no., etc.). The locations on the logical device may be translated by the storage device to physical storage locations. Note that contiguous sections of logical storage locations may correspond to noncontiguous sections of physical storage locations and that it is possible for a single logical volume to correspond to more than one physical volume. In an embodiment herein, each logical volume has a number of cylinders that each contain a plurality of tracks of data and each track of data contains a number of 512-byte blocks of data.

In an embodiment herein, each of the devices 32, 34, 36 coupled to the storage area network 30 and uses a unique worldwide port name (WWPN) to identify the ports of devices coupled to the storage area network 30. The WWPN may be a unique 64-bit number that may be assigned by the manufacturer of a device. In some instances, at least a portion of the WWPN is assigned by a trade group which provides unique identifiers to different manufacturers to ensure that each WWPN is unique and contains appropriate manufacturer identification information. In FIG. 2, the identifier HOST_P is used to represent the WWPN of the host 32 while the identifier OLD_P is used to represent the WWPN of the old storage device 34. Such identifiers may be used to represent the WWPN of specific ports to facilitate the description herein. Note, however, that any appropriate identifiers may be used to identify ports of devices coupled to the storage area network 30.

Connections between ports of devices provided by the storage area network 30 may be specified in a conventional fashion using appropriate instructions to the one or more switches of the storage area network 30. The instructions may indicate which port connections are proper by establishing zones, which may also indicates which of the ports may initiate a data-path connection. For example, a zone may indicate that it is appropriate to couple the HOST_P port of the host device 32 with the OLD_P port of the old storage device 34. The zone may also indicate that the HOST_P port may be the initiator of the data-path connection. In other embodiments, the zone may not include information indicating initiator and target roles of ports. The one or more switches that provide the storage area network 30 may then be provided with appropriate instructions to set up a zone between HOST_P and OLD_P with the HOST_P port being the allowable initiator. Subsequently, when the old storage device 34 is coupled to the storage area network 30 via the OLD_P port, the switch(es) of the storage area network 30 receive a signal from the old storage device 34 indicating that the OLD_P port is available. Similarly, the switch(es) of the storage area network 30 receive a signal from the host 32 via the HOST_P port to indicate that the HOST_P port is available. Following that, the host 32 may initiate a data-path connection with the old storage device 34 using the HOST_P port, in which case the one or more switches of the storage area network 30 may establish the data-path connection between the HOST_P port and the OLD_P port. Such a connection is illustrated by the dashed line within the storage area network 30 in FIG. 2.

The system described herein provides a transparent transition whereby the host 32 initially performs I/O operations with the old storage device 34 (as shown in FIG. 2) and then transitions to performing I/O operations with the new storage device 36 in a way that does not require significant alteration of the switch(es) within the storage area network 30 and does not require reprogramming or halting applications running in the host 32. The coupling between the host 32 and the old storage device 34 is broken, a data migration from the old storage device 34 to the new storage device 36 is initiated, and I/O operations are resumed between the host 32 and the new storage device 36, all transparent to the host 32.

Figure 3:
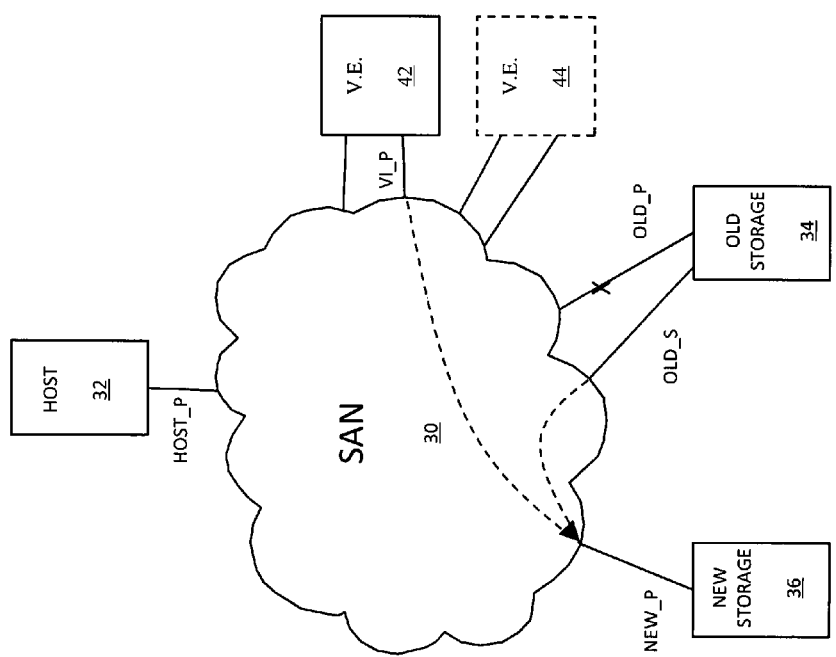
FIG. 3 is a diagram illustrating a storage area network coupled to a host, a new storage device, an old storage device, a virtualization engine, and a secondary virtualization engine with a data path from the virtualization engine to the old storage device according to the system described herein.

Referring to FIG. 3, the storage area network 30 is shown as having coupled thereto a virtualization engine 42, which facilitates I/O redirection and acts as a virtualization engine in a manner described in more detail elsewhere herein. The virtualization engine 42 includes at least two ports that may be coupled to the storage area network 30. One of the ports may be an initiator port VI_P. As described in more detail elsewhere herein, the virtualization engine 42 facilities data redirection so that I/O operations from the host 32 directed to the OLD_P port of the old storage device 34 are redirected to the new storage device 36. In an embodiment herein, the virtualization engine 42 may be implemented using an Emulex AV150 ASIC on an AD1500 board in a Linux server or an Emulex Raptor ASIC on an AD2500 board in a Linux server. In other embodiments, it may be possible to provide the Emulex products, or similar products, directly on the host 32 and/or one of the storage devices 34, 36.

A secondary virtualization engine 44 may also be provided and coupled to the storage area network 30. The secondary virtualization engine 44 may be used to provide redundancy for the virtualization engine 42. In an embodiment herein, the secondary virtualization engine 44 is not used unless and until the virtualization engine 42 fails, in which case the secondary virtualization engine 44 may perform the tasks otherwise performed by the virtualization engine 42. However, in other embodiments, it is possible to split the work load between the virtualization engine 42 and the secondary virtualization engine 44 during normal operation. In such a case, if one of the virtualization engines 42, 44 fails, all the workload is shifted to the non-failing one of the virtualization engines 42, 44. For the remainder of the discussion herein, it may be assumed that the secondary virtualization engine 44 and/or any other appropriate redundant components are provided to protect against failure of a single component. However, redundant components will not be discussed further in detail herein.

As shown in FIG. 3, a connection (and zone) may be established between the port in VI_P of the virtualization engine 42 and the port NEW_P of the new storage device 36. The data-path connection between the ports VI_P and NEW_P may be used to facilitate I/O redirection as described in more detail elsewhere herein. FIG. 3 also illustrates establishing a new port, OLD_S, at the old storage device 34 and establishing a connection (and zone) from the OLD_S port of the old storage device 34 to the NEW_P port of the new storage device 36. The "_P" and "_S" suffixes may be used to indicate primary and secondary ports. The connection between OLD_S and NEW_P may be used to facilitate data migration from the Old storage device 34 to the new storage device 36, as described in more detail elsewhere herein. Note also that the OLD_P port of the old storage device 34 has been blocked, thus breaking the data-path connection between the OLD_P port of the old storage device 34 and the HOST_P port of the host device 32.

In some embodiments, it may be possible to use virtual logical ports implemented with N Port ID virtualization (NPIV) where a single physical port may function as a plurality of logical ports. For example, it may be possible to provide OLD_P and OLD_S on the same physical port. In some cases, it may be desirable to not mix initiator and target logical ports on the same physical port. In other situations, it may be acceptable to provide initiator and target logical ports on the same physical port.

Figure 4:
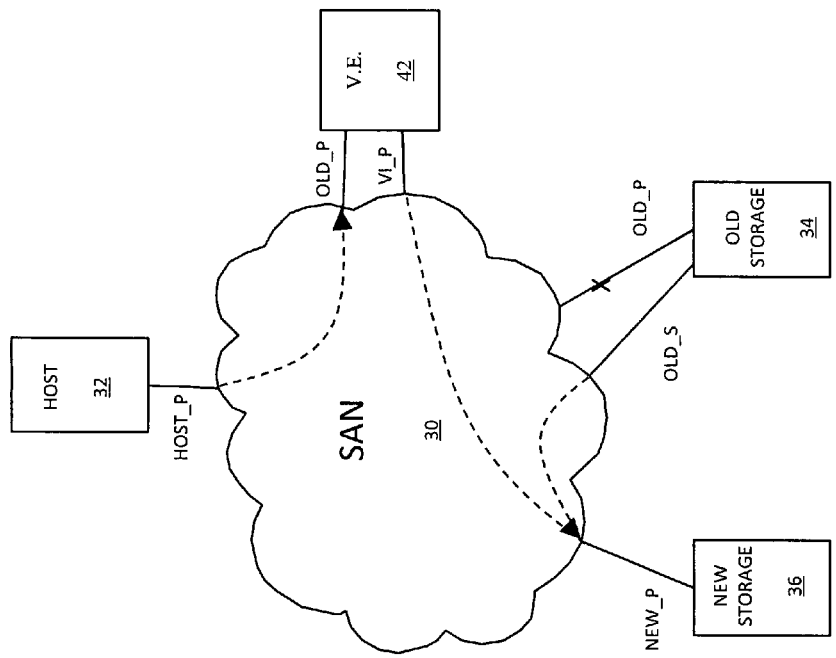
FIG. 4 is a diagram illustrating a storage area network coupled to a host, a new storage device, an old storage device, and a virtualization engine with a data path from the host to the virtualization engine according to the system described herein.

In FIG. 4, the virtualization engine 42 is shown as having a target port OLD_P that has a worldwide port name (WWPN) identical to the OLD_P port of the old storage device 34. The OLD_P port of the virtualization engine 42 is coupled (by, for example, via switch zoning) to the HOST_P port of the host 32 so that I/O operations from the host 32 by at the HOST_P/OLD_P connection (zone) are now provided through the virtualization engine 42. Any I/O operations destined for the OLD_P port of the first storage device 34 go to the OLD_P port of the virtualization engine 42. Operation of the virtualization engine 42 in connection with the configuration illustrated by FIG. 4 is described in more detail elsewhere herein.

Figure 5:
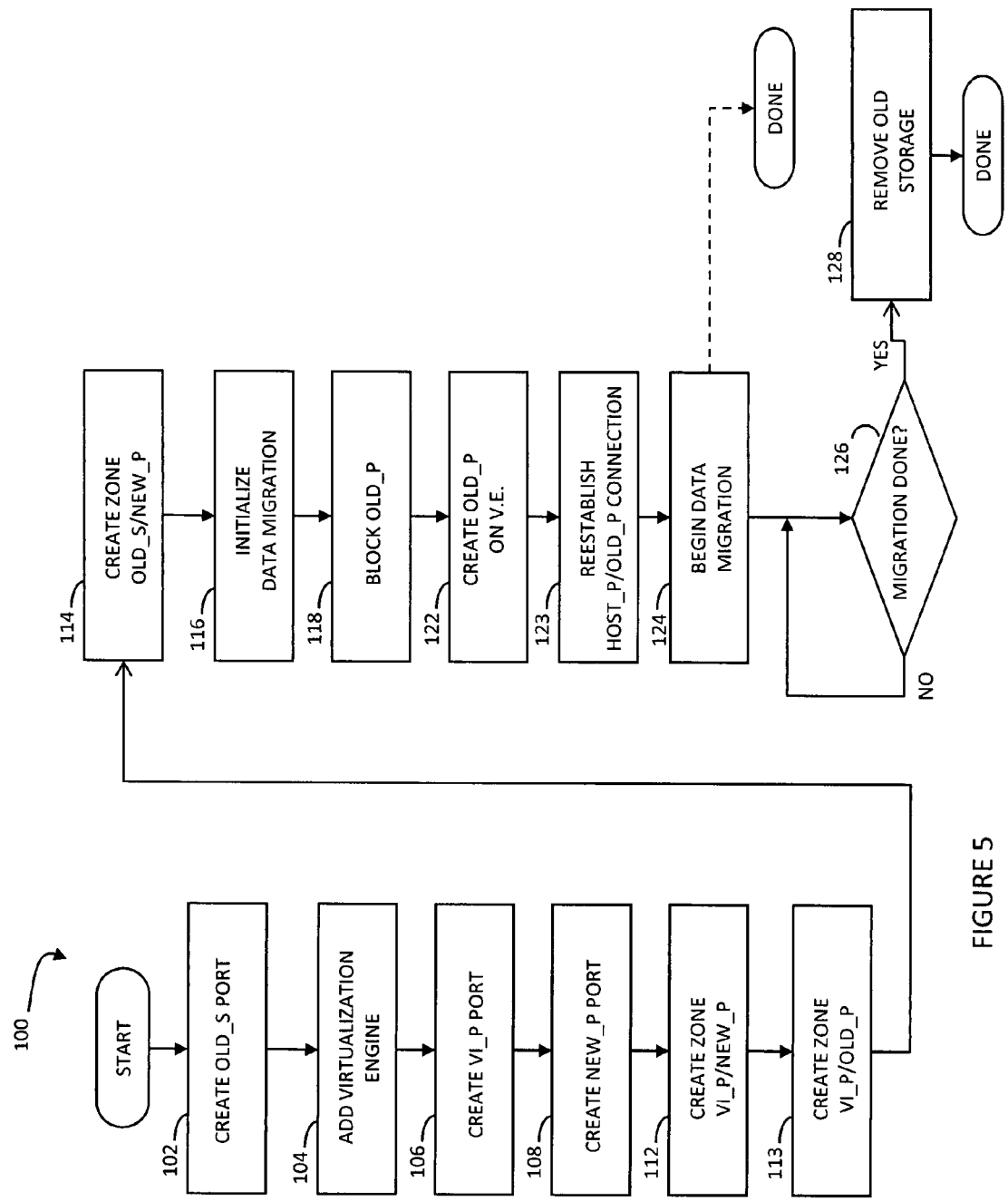
FIG. 5 is a flowchart illustrating steps performed in connection with establishing I/O redirection to a new storage device through a storage area network and a virtualization engine according to the system described herein.

Referring to FIG. 5, a flowchart 100 illustrates steps performed in connection with reconfiguring and redirecting I/O as illustrated in FIGS. 2-4, discussed above. Processing begins at a first step 102 where the OLD_S port is created (initialized) at the old storage device 34. The OLD_S port may be used to facilitate data migration from the old storage device 34 to the new storage device 36. The OLD_S port may have the same visibility as the OLD_P port meaning that the OLD_S port may be used to access the same data on the old storage device 34 as the OLD_P port. This allows the OLD_S port to effectively access and migrate data from the old storage device 34.

Following the step 102 is a step 104 where the virtualization engine 42 is coupled to the storage area network 30. Following the step 104 is a step 106 where the VI_P port is created at the virtualization engine 42. Following the step 106 is a step 108 where the NEW_P port is created on the new storage device 36. Note that, in some cases, it may be necessary or useful to allocate and provision (set up) at the new storage device 36 logical units that correspond to logical units of the old storage device 34 from which data is being migrated. The logical units provisioned on the new storage device 36 may be the same size or bigger than logical units of the old storage device 34.

Following the step 108 is a step 112 where a zone VI_P/NEW_P is created to provide the connection between the VI_P port of the virtualization engine 42 and the NEW_P port on the new storage device 36. Following the step 112 is a step 113 where a zone VI_P/OLD_P is created. The zone VI_P/OLD_P is provided for a temporary connection therebetween to allow the virtualization engine 42 to operate on the old storage device 34 and/or on OLD_P (for discovery purposes). In some cases, it may be possible to eliminate the step 113 in systems where the virtualization engine may manipulate the old storage device 34/OLD_P port without needing to first connect thereto.

Following the step 113 is a step 114 where a zone is created between the OLD_S port on the old storage device 34 and the NEW_P port on the new storage device 36 to provide connection therebetween for data migration. Following the step 114 is a step 116 where data migration is initialized. In an embodiment herein, although data migration is initialized at the step 116, the migration is not begun until later on in the processing.

Following the step 116 is a step 118 where the OLD_P port on the old storage device 34 is blocked, thus suspending communication between the host 32 and the old storage device 34.

Following the step 118 is a step 122 where a port with a WWPN of OLD_P (identical to the WWPN of the port on the old storage device 34) is created on the virtualization engine 42. As discussed elsewhere herein, the port on the virtualization engine 42 is provided with the same WWPN (or other appropriate identifier) as the port on the old storage device 34 that was in communication with the host 32. Note also that data-path connections may be facilitated by actions performed by the different devices in connection with initialization I/O operations. For example, blocking the OLD_P port on the old storage device 34 may cause a data disconnect to occur at the HOST_P port of the host 32. The host 32 may then continuously retry the I/O operation until after the OLD_P port is created at the virtualization engine 42, in which case a data reconnect will occur. In some instances, the host may retry I/O operations for a finite period of time (possibly dictated by the operating system) after which retries are not attempted. Accordingly, the system described herein is designed to have the host 32 be disconnected for an amount of time that is less than the finite period of time after which retries are not attempted.

Following the step 122 is a step 123, where the connection between the HOST_P port (at the host 32) and the OLD_P port (now on the virtualization engine 42) is reestablished. Note that, although processing at the step 123 may cause the host 32 to connect to the virtualization engine 42 for the first time, from the perspective of the host 32, the connection to the OLD_P port is being reestablished since the host 32 had been previously connected to the OLD_P port. Thus, the host 32 experiences a disconnect (at the step 118) and a subsequent reconnect (at the step 123) to what is apparently the same port. Following the step 123 is a step 124 where data migration is initiated. In some embodiments, data migration may be initiated in connection with a first I/O operation from the host 32 to the new storage device 36. In other embodiments, the data migration operation may be begun at any time after the OLD_P port is blocked at the old storage device 34 at the step 118.

In some embodiments, the processing is complete after beginning data migration at the step 124. This is illustrated by the dashed line on the flowchart 100 from the step 124. In other embodiments, further processing may be performed in order to facilitate removal of the old storage device 34. For such embodiments, control transfers from the step 124 to a test step 126, where it is determined if the migration of data from the old storage device 34 to the new storage device 36 is complete. If not, then control transfers back to the step 126 to continue polling until the migration is complete. Although not shown in the flowchart 100, it is possible to provide a delay step along with the polling cycles corresponding to the test step 126.

Once it is determined at the test step 126 that data migration is complete, then control transfers from the test step 126 to a step 128 were the old storage device 34 may be removed from the system. At the step 126, the old storage device 34 may be physically removed from the storage area network 30. Alternatively, the old storage device 34 may be maintained at the same physical location but used for another purpose, in which case OLD_P may remain blocked on the old storage device 34. Following the step 128, processing is complete.

Note that, in some embodiments, data migration may not be necessary and/or desirable. For example, if the affected volume(s) on the new storage device 36 are maintained as mirrors of the volume(s) on the old storage device 34, then the transition may occur without performing data migration. In such a case, operations corresponding to the steps 116, 124, 126 of the flowchart 100 may be eliminated. There may also be other instances where data migration is not necessary and/or desirable.

Figures 6, 7:
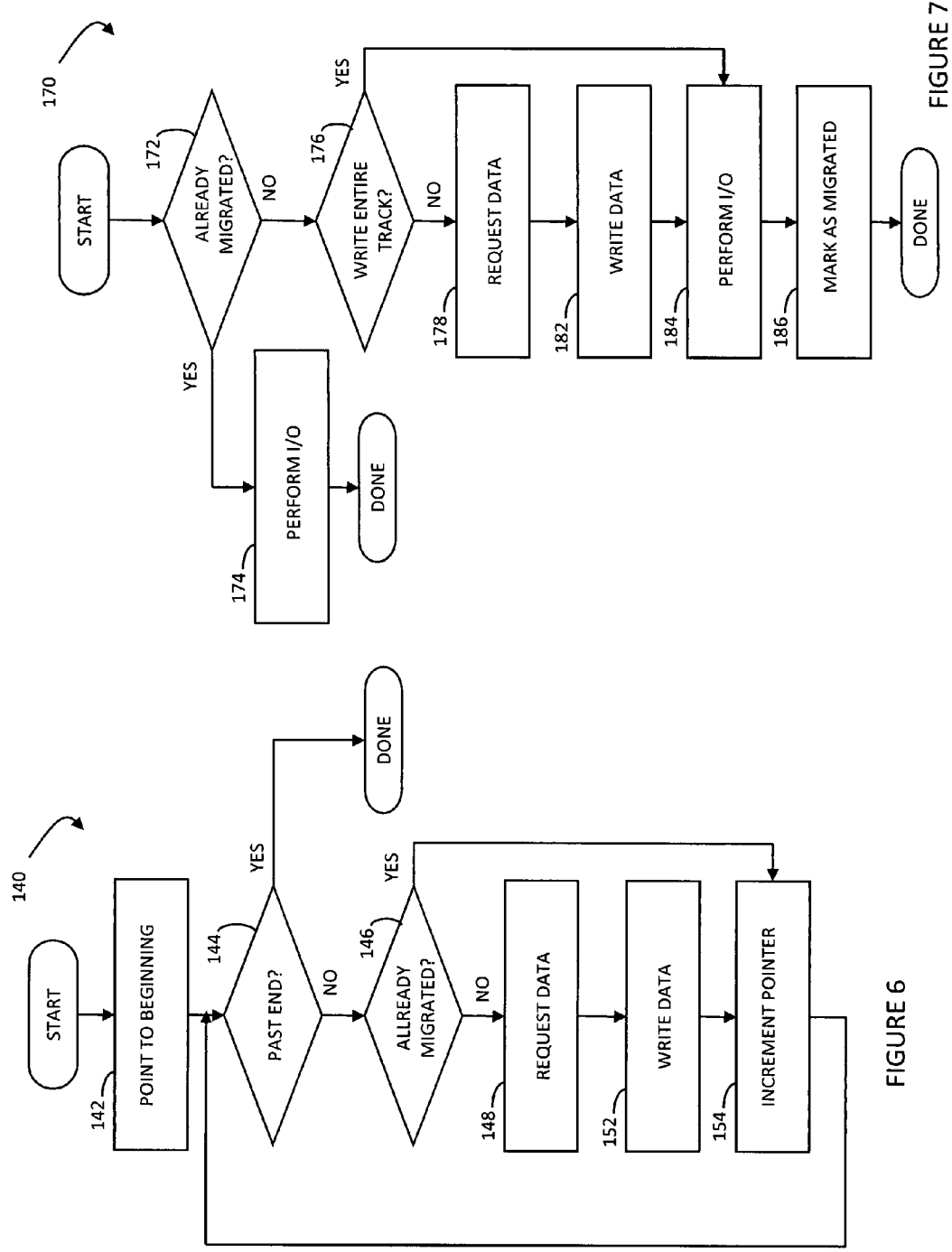
FIG. 6 is a flowchart illustrating data migration from an old storage device to a new storage device according to the system described herein.
FIG. 7 is a flowchart illustrating handling I/O operations during data migration from an old storage device to a new storage device according to the system described herein.

Referring to FIG. 6, a flowchart 140 illustrates steps performed in connection with migrating data from the old storage device 34 to the new storage device 36. Processing begins at a first step 142 where a pointer that is used to iterate through all of the tracks (or blocks, or whatever data increment is moved in one iteration) is made to point to the beginning of the data being migrated. In an embodiment herein, entire logical volumes may be migrated a track at a time so that, at the step 142, the pointer used for migration points to the first track of the logical volume of the old storage device 34. Of course, it will be appreciated by one of ordinary skill in the art that any appropriate increments may be used for migration (e.g., blocks, partial tracks, multiple tracks, variable amounts, etc.) and that it is possible to migrate the entire old storage device 34, one or more logical volumes of the old storage device 34, one or more physical volumes of the old storage device 34, one or more portions of one or more logical volumes of the old storage device 34, and/or one or more portions of one or more physical volumes of the old storage device 34.

Following the step 142 is a test step 144 where it is determined if the pointer that iterates through the logical volume of the old storage device 34 points past the end of the logical volume. If so, then processing is complete and the logical volume has been migrated. Otherwise, control transfers from the test step 144 to a test step 146 where it is determined if the data pointed to by the pointer has already been migrated. As discussed elsewhere herein, it is possible for data to be migrated processes other than the process illustrated by the flowchart 140, such as in connection with an I/O operation. Any appropriate mechanism may be used to indicate which data of the logical volume has already been migrated. In some cases, metadata for a track (or some other data increment) may directly indicate whether the track has been migrated. Of course, any appropriate mechanism may be used to indicate which data has already been migrated.

If it is determined at the test step 146 that the data pointed to by the pointer that iterates through the logical volume has not already been migrated, then control transfers from the test step 146 to a step 148 where the data is requested from the old storage device 34. The amount of data that is requested at the step 148 depends upon the data increments that are transferred at any one time (one iteration) in connection with the migration. In an embodiment herein, a track's worth of data is requested at the step 148. Following the step 148 is a step 152 where the data obtained from the old storage device 34 at the step 148 is written to the new storage device 36 at a corresponding location (e.g., same relative track position). Writing the data at the step 152 also includes marking the data as already migrated using the appropriate mechanism to indicate which data has already been migrated. Following the step 152 is a step 154 where the pointer used to iterate through the logical volume being migrated is incremented. Following the step 154, control transfers back to the test step 144 for the next iteration. Note that it is possible to have the virtualization engine 42, the old storage device 34, the new storage device 36, a separate device (not shown) or any combination thereof perform the steps illustrated by the flowchart 140 of FIG. 6.

If it is determined at the test step 146 that the data pointed to by the pointer that iterates through the logical volume has already been migrated, then control transfers from the test step 146 to the step 154 to prepare for the next iteration. Instances where data may have already been migrated by a process other than the process illustrated by the flowchart 140 are discussed in more detail elsewhere herein.

Referring to FIG. 7, a flowchart 170 illustrates steps performed in connection with an I/O operation provided by the host device 32 during data migration from the old storage device 34 to the new storage device 36. Processing begins at a first step 172 where it is determined if the data being affected by the I/O operation has already been migrated. If so, then controlled transfers from the test step 172 to a step 174 where the I/O operation is performed in a conventional fashion (but using the new storage device 36 and the virtualization engine 42 in a way that is transparent to the host 32). Following the step 174, processing is complete.

If it is determined at the test step 172 that the data being affected by the I/O operation has not already been migrated, then control transfers from the test step 172 to a test step 176 where it is determined if the I/O operation writes an entire track's worth of data (or whatever increment is provided in a single migration iteration). Note that if the migration operation illustrated by the steps of the flowchart 140 migrates an increment that is different from a track, then the test at the step 176 may be adjusted accordingly to determine, generally, if the I/O operation writes an amount of data equal to the increment of data migrated at each iteration of the migration operation. Note that if the I/O operation writes an entire track's worth of data (or other appropriate increment), then it is not necessary to migrate any data prior to writing the entire track.

If it is determined at the test step 176 that the I/O operation does not write an entire full track of data (or some other increment), then control transfers from the test step 176 to a step 178 where a track (or other increment) of data is requested from the old storage device 34. Following the step 178 is a step 182 where the data obtained from the old storage device at the step 178 is written to the new storage device 36. Following the step 182 is a step 184 where the I/O operation of the host 32 is performed at the new storage device 36. Following the step 184 is a step 186 where the track written at the step 184 is marked as a migrated using whatever mechanism the system uses to indicate which tracks have been migrated. Following the step 186, processing is complete.

Figure 8:
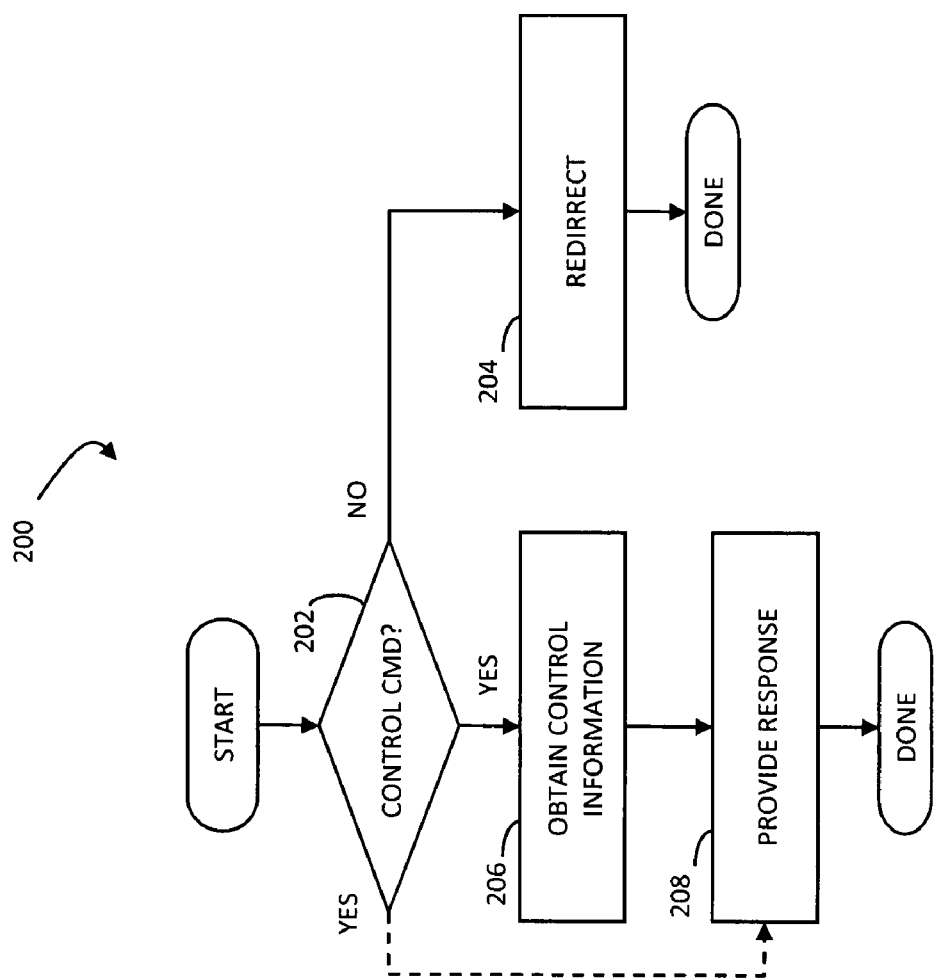
FIG. 8 is a flowchart illustrating steps performed in connection with handling command/status requests and data I/O requests in connection with I/O redirection according to the system described herein.

Referring to FIG. 8, a flowchart 200 illustrates steps that are performed in connection with the virtualization engine 42 servicing data I/O requests as well as command/status requests that are initially destined by the host 32 for the first storage device 34. Processing begins at a first step 202 where it is determined if the I/O operation from the host 32 is a control/status request. If not, then the request is a data I/O request, in which case control transfers from the step 202 to a step 204 where the I/O is redirected by the virtualization engine 42 to the new storage device 36 using the VI_P/NEW_P connection. Note that redirection may only occur if the data I/O from the host 32 is generated to a destination that has been already mapped in the virtualization engine 42. If the mapping does not exist, the I/O may be handled the same way as a command/status I/O.

In some embodiments, the processing illustrated by the steps 202, 204 may be performed by the hardware. For example, the Emulex products discussed above that may be used for the virtualization engine 42 provide a split path architecture that allows data I/O requests to be redirected with relatively little latency when compared with systems that sort data and command/status requests using a conventional processor. The Emulex hardware automatically redirects mapped data I/O requests without further processing outside the hardware.

If it is determined at the test step 202 that the request is a control/status request, then control transfers from the test step 202 to a step 206 where the control/status information needed to service the request is obtained from the old storage device 34. In other embodiments, the control/status information needed to service the requests may be provided from one or more pre-initialized locations within the virtualization engine. Information may be obtained in any appropriate fashion, such as a connection through the storage area network 30 between the virtualization engine 42 and the old storage device 34 (connection not shown in figures) and/or by a direct connection between the virtualization engine 42 and the old storage device 34 (connection not shown in figures). Following the step 206 is a step 208 where the response is provided to the host device 32. As discussed elsewhere herein, the response provided to the host device 32 is designed to be identical (or nearly identical, as appropriate) to the response the host device 32 would have received had there not been a redirection to the new storage device 36. Following the step 208, processing is complete.

In some embodiments, it is possible that part of the system initialization process includes having the virtualization engine 42 receive status information from the old storage device 34, which the virtualization engine 42 saves in order to be able to respond to future control/status requests. Data for answering any control/status requests that may be posed by the host 32 are already stored by the virtualization engine 42 and thus it, is not necessary to obtain any information at the step 206. This embodiment is illustrated by an alternative path from the test step 202 to the step 208, illustrated by a dashed line. Note that when the old storage device 34 is removed from the storage area network 30, control/status requests are not redirected to the old storage device 34.

In some instances, it may be desirable to integrate the functionality of the virtualization engine into the new storage device to eliminate the need for a separate external virtualization engine coupled to the storage area network. In such a case, the new storage device may connect to the storage area network using a port having an identifier that corresponds to the identifier previously used by the old storage device to connect to the storage area network.

Figure 9:
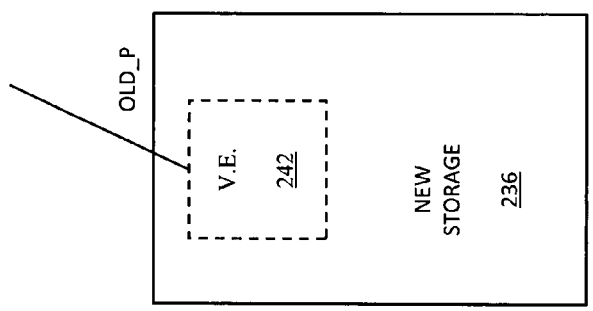
FIG. 9 is a diagram illustrating a new storage device having virtualization engine functionality integrated therewith according to the system described herein.

Referring to FIG. 9, a new storage device 236 is shown having a virtualization engine 242 (virtualization engine functionality) integrated therewith. The new storage device 236 has a port with a WWPN of OLD_P, which is identical to the WWPN of the port of an old storage device (not shown in FIG. 9) from which data is being migrated. As explained in more detail below, the system transitions a host (not shown in FIG. 9) from communicating with the old storage device to communicating with the new storage device 236 in a way that is transparent to the host. The new storage device 236 appears to the host to be the old storage device. The virtualization engine functionality may be provided to the new storage device 236 using an Emulex AV150 ASIC on an AD1500 board, an Emulex Raptor ASIC on an AD2500 board and/or any other appropriate technology.

Figure 10:
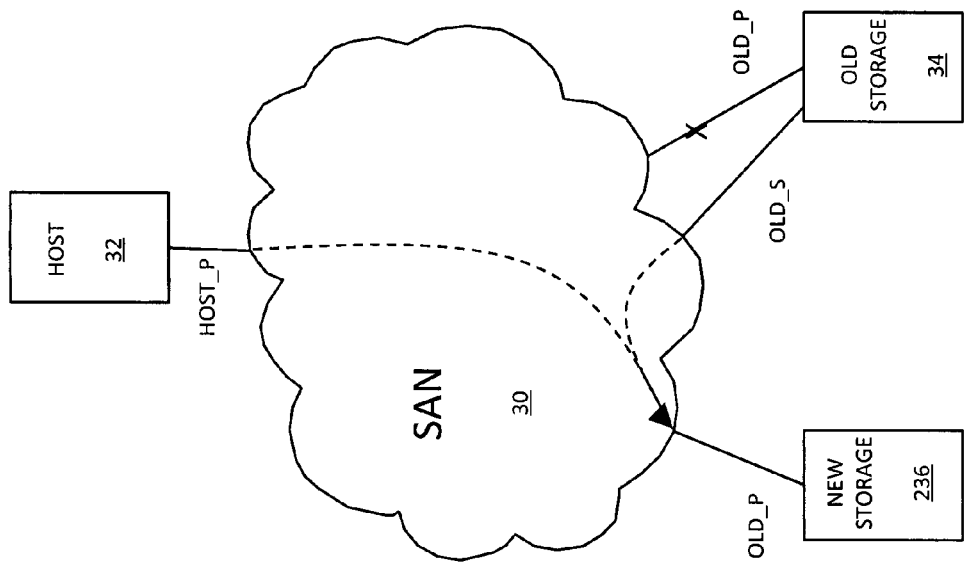
FIG. 10 is a diagram illustrating a storage area network coupled to a host, a new storage device, and an old storage device, with a data path from the host to the new storage device according to the system described herein.

Referring to FIG. 10, a diagram illustrates the storage area network 30, with the host 32 coupled thereto via the port having a WWPN of HOST_P, as discussed above (see FIGS. 2-4). The old storage device 34 is also coupled to the storage area network 30. As shown in FIG. 10, the old storage device 34 has a port with a WWPN of OLD_P, which is shown as blocked, but which had been previously used by the host 32 to communicate with the old storage device 34 (see, for example, the initial system state illustrated by FIG. 2). The old storage device 34 also has a data port with a WWPN of OLD_S, which is coupled to the storage area network 30.

The new storage device 236 is coupled to the storage area network 30 by a port having a WWPN of OLD_P (the WWPN of the port previously used by the old storage device 34). The storage area network 30 establishes a first communication path from the HOST_P port of the host 32 to the OLD_P port of the new storage device 236 to facilitate redirection of I/O operations by the host 32 to the new storage device 236. The storage area network 30 establishes a second communication path from the OLD_S port of the old storage device 34 to the OLD_P port of the new storage device 236 to facilitate migrating data from the old storage device 34 to the new storage device 236. Transitioning from the initial state illustrated by FIG. 2 to the final state illustrated by FIG. 10 is described in more detail below.

Figure 11:
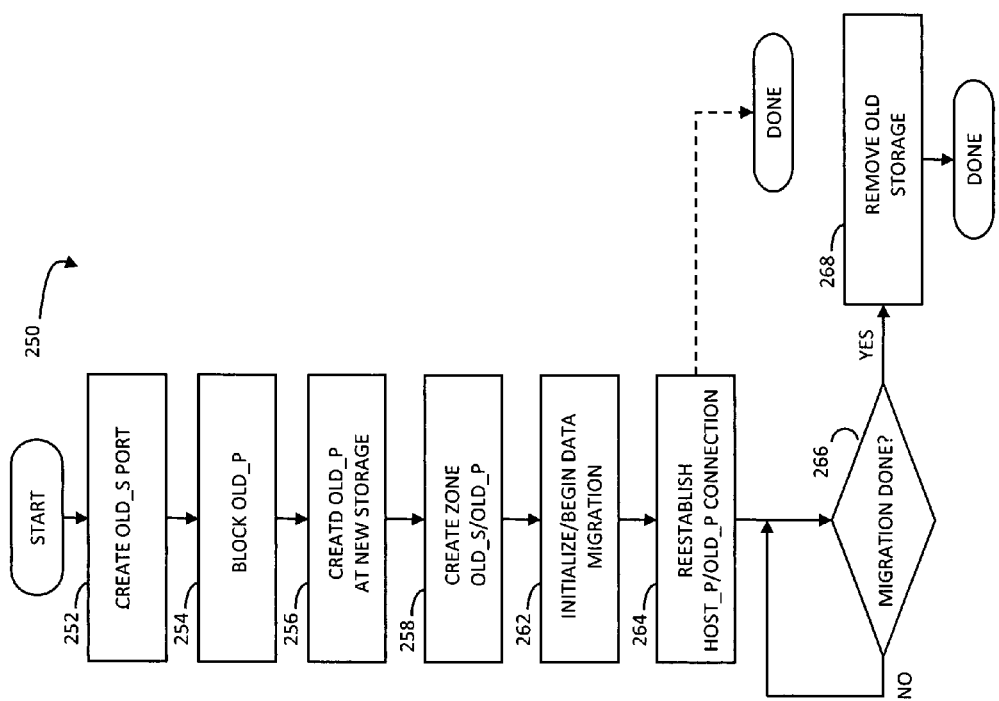
FIG. 11 is a flowchart illustrating steps performed in connection with establishing I/O redirection to a new storage device through a storage area network according to the system described herein.

Referring to FIG. 11, a flowchart 250 illustrates steps performed in connection with transitioning the host 32 from using the old storage device 34 to using the new storage device 236 and initiating a data migration from the old storage device 34 to the new storage device 236. As discussed elsewhere herein, the transition from using the old storage device 34 to using the new storage device 236 is designed to be transparent to the host 32. Many of the steps of the flowchart 250 are like steps of the flowchart 100 of FIG. 5, discussed above.

Processing begins at a first step 252 where the OLD_S port is created on the old storage device 34. Following the step 252 is a step 254 where the OLD_P port on the old storage device 34 is blocked. Following the step 254 is a step 256 where the OLD_P port is created at the new storage device. Following the step 256 is a step 258 where a zone OLD_S/OLD_P is created. The connection between OLD_S at the old storage device 34 and OLD_P at the new storage device 236 is used to facilitate data migration from the old storage device 34 to the new storage device 236.

Following the step 258 is a step 262 where the system initializes and begins data migration from the old storage device 34 (port OLD_S) to the new storage device (port OLD_P). Following the step 262 is a step 264 where the connection between the HOST_P port (at the host 32) and the OLD_P port (now on the new storage device 236) is reestablished. Note that, although processing at the step 264 may cause the host 32 to connect to the new storage device 236 for the first time, from the perspective of the host 32, the connection to the OLD_P port is being reestablished since the host 32 had been previously connected to the OLD_P port. Thus, the host 32 experiences a disconnect (at the step 254) and a subsequent reconnect (at the step 264) to what is apparently the same port.

In some embodiments, processing is complete following the step 264. In other embodiments where the old storage device is being disconnected from the storage area network 30, processing proceeds from the step 264 to a test step 266 where it is determined if the data migration is complete. As with the step 126 of the flowchart 100 of FIG. 5, the system continues to poll until the migration is done, following which control transfers to the step 268 where the old storage device 34 may be disconnected from the storage area network 30. Following the step 268, processing is complete.

Note that integrating the virtualization engine functionality with the new storage device 236 does not appreciably alter the data migration illustrated by the flowchart 140 of FIG. 6, handling I/O operations during migration illustrated by the flowchart 170 of FIG. 7, and handling control/status requests illustrated by the flowchart 200 of FIG. 8. In an embodiment herein, it is possible that part of the system initialization process includes having the new storage device 236 receive status information from the old storage device 34, which the new storage device 236 saves in order to be able to respond to future control/status requests. Data for answering any control/status requests that may be posed by the host 32 are already stored by the new storage device 236. In other embodiments, control/status requests may be redirected to the old storage device 34. However, in instances where the old storage device 34 is removed from the storage area network 30, control/status requests may not be redirected to the old storage device 34. As with the virtualization engine 42, the new storage device 236 may contain hardware that automatically remaps appropriate I/O operations.

The system described herein does not depend upon any particular protocol used for establishing ports, establishing connections between ports, and disconnecting and reconnecting data paths between the ports. Accordingly, the system described herein may use any appropriate protocol/syntax.

Although the system described herein uses tracks as a unit of data for certain purposes, it should be understood that other units of data (including, possibly, variable length units of data) may be used. This also applies to other data structures and data units. In addition, in some instances, the order of steps in the flowcharts may be modified, where appropriate. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein. The system also includes computer software, in a computer readable medium, that executes any of the steps described herein.

While the invention has been disclosed in connection with various embodiments, modifications thereon will be readily apparent to those skilled in the art. Accordingly, the spirit and scope of the invention is set forth in the following claims.

What is claimed is:

1. A method of transferring I/O from a first storage device coupled to a storage area network to a second storage device coupled to the storage area network, the method comprising:
   blocking I/O operations for a first port of the first storage device coupled to the storage area network, wherein the first port of the first storage device is associated with an identifier;
   coupling the second storage device to the storage area network via a first port of the second storage device associated with the identifier;
   establishing a connection between a host and the first port of the second storage device to cause I/O operations by the host to be routed to the second storage device, wherein the second storage device appears to the host to be the first storage device; and
   following blocking I/O operations for the first port of the first storage device, coupling a second port of the first storage device to the storage area network and migrating data from the first storage device to the second storage device through the second port of the first storage device and using the first port of the second storage device associated with the identifier.

2. A method, according to claim 1, wherein, in response to the second storage device receiving an I/O operation for data that has not yet been migrated from the first storage device, the second storage device causes the data to be migrated prior to servicing the I/O operation.

3. A method, according to claim 1, further comprising:
following completion of data migration from the first storage device to the second storage device, removing the first storage device from the storage area network.

4. A method, according to claim 1, further comprising:
the second storage device servicing command/status requests destined for the first storage device.

5. A method, according to claim 4, wherein the second storage device includes hardware that automatically redirects command/status requests to the first storage device.

6. A method, according to claim 1, wherein the identifiers associated with the ports are worldwide port names.

7. A method, according to claim 1, wherein the storage area network provides fibre channel connections.

8. Computer software, stored in a non-transitory computer-readable storage medium, that transfers I/O from a first storage device coupled to a storage area network to a second storage device coupled to the storage area network, the software comprising: executable code that blocks I/O operations for a first port of the first storage device coupled to the storage area network, wherein the first port of the first storage device is associated with an identifier; executable code that establishes a connection between the second storage device and the storage area network via a first port of the second storage device associated with the identifier; executable code that establishes a connection between a host and the first port of the second storage device to cause I/O operations by the host to be routed to the second storage device, wherein the second storage device appears to the host to be the first storage device; and executable code that establishes a connection between a second port of the first storage device and the storage area network and that migrates data from the first storage device to the second storage device through the second port of the first storage device following blocking I/O operations for the first port of the first storage device and using the first port of the second storage device associated with the identifier.

9. Computer software, according to claim 8, wherein, in response to the second storage device receiving an I/O operation for data that has not yet been migrated from the first storage device, executable code of the second storage device causes the data to be migrated prior to servicing the I/O operation.

10. Computer software, according to claim 8, further comprising:
executable code that causes the second storage device to service command/status requests destined for the first storage device.

11. Computer software, according to claim 8, wherein the identifiers associated with the ports are worldwide port names.

12. Computer software, according to claim 8, wherein the storage area network provides fibre channel connections.

13. A system for redirecting I/O operations, comprising:
a storage area network;
a first storage device coupled to the storage area network via a first port of the first storage device associated with an identifier; and
a second storage device coupled to the storage area network via a first port of the second storage device associated with the identifier, wherein the first port of the first storage device is blocked and I/O operations are routed to the second storage device through the storage area network, wherein the second storage device appears to an external device to be the first storage device, and wherein, following blocking I/O operations for the first port of the first storage device, a second port of the first storage device is coupled to the storage area network and data is migrated from the first storage device to the second storage device through the second port of the first storage device and using the first port of the second storage device associated with the identifier.

14. A system, according to claim 13, wherein, in response to the second storage device receiving an I/O operation for data that has not yet been migrated from the first storage device, the second storage device causes the data to be migrated prior to servicing the I/O operation.

15. A system, according to claim 13, wherein following completion of data migration from the first storage device to the second storage device, the first storage device is removed from the storage area network.

16. A system, according to claim 13, wherein the identifiers associated with the ports are worldwide port names.

17. A system, according to claim 13, wherein the storage area network provides fibre channel connections.

* * * * *